(12) United States Patent
Komatsu et al.

(10) Patent No.: US 12,399,558 B2
(45) Date of Patent: Aug. 26, 2025

(54) USER TERMINAL, DATA PROCESSING METHOD, AND NON-TRANSITORY STORAGE MEDIUM

(71) Applicant: JVCKENWOOD Corporation, Yokohama (JP)

(72) Inventors: Seiji Komatsu, Yokohama (JP); Takayuki Sugahara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 6 days.

(21) Appl. No.: 18/599,259

(22) Filed: Mar. 8, 2024

(65) Prior Publication Data

US 2024/0211042 A1 Jun. 27, 2024

Related U.S. Application Data

(63) Continuation of application No. PCT/JP2022/025372, filed on Jun. 24, 2022.

(30) Foreign Application Priority Data

Sep. 14, 2021 (JP) ................................. 2021-149566

(51) Int. Cl.
*G06F 3/01* (2006.01)
*H04N 19/14* (2014.01)

(52) U.S. Cl.
CPC .............. *G06F 3/013* (2013.01); *H04N 19/14* (2014.11)

(58) Field of Classification Search
CPC .......... G06F 3/013; G06F 3/011; G06F 3/012; G06F 3/017; G06F 3/04815;
(Continued)

(56) References Cited

U.S. PATENT DOCUMENTS

2017/0127011 A1 5/2017 Okajima et al.
2018/0059783 A1* 3/2018 van Hoff ............ H04N 21/4788
2019/0026874 A1* 1/2019 Jin .......................... G06F 3/013

FOREIGN PATENT DOCUMENTS

JP 11-215498 8/1999
JP 2008-233765 10/2008
WO 2015/190093 12/2015

OTHER PUBLICATIONS

International Search Report and Written Opinion for International Application Serial No. PCT/JP2022/025372 mailed on Sep. 6, 2022, 9 pages.

\* cited by examiner

*Primary Examiner* — Farhan Mahmud
(74) *Attorney, Agent, or Firm* — Amin, Turocy & Watson, LLP

(57) ABSTRACT

A user terminal includes: an acquisition unit configured to acquire processing target data that includes image data; a measurement unit configured to measure, as biological information, line-of-sight information on a user on the user and other biological information other than the line-of-sight information; a calculation unit configured to calculates importance of the processing target data based on the line-of-sight information and the other biological information; a determination unit configured to determine a compression detail of the processing target data in accordance with the calculated importance; and a compression unit configured to compress the processing target data in accordance with the compression detail that is determined by the determination unit.

7 Claims, 8 Drawing Sheets

(58) Field of Classification Search
CPC ........... G06T 19/006; G06T 7/70; G06T 7/73; G06T 19/00; G06T 2207/30201; G02B 27/017; G02B 27/0093; G06V 20/20
See application file for complete search history.

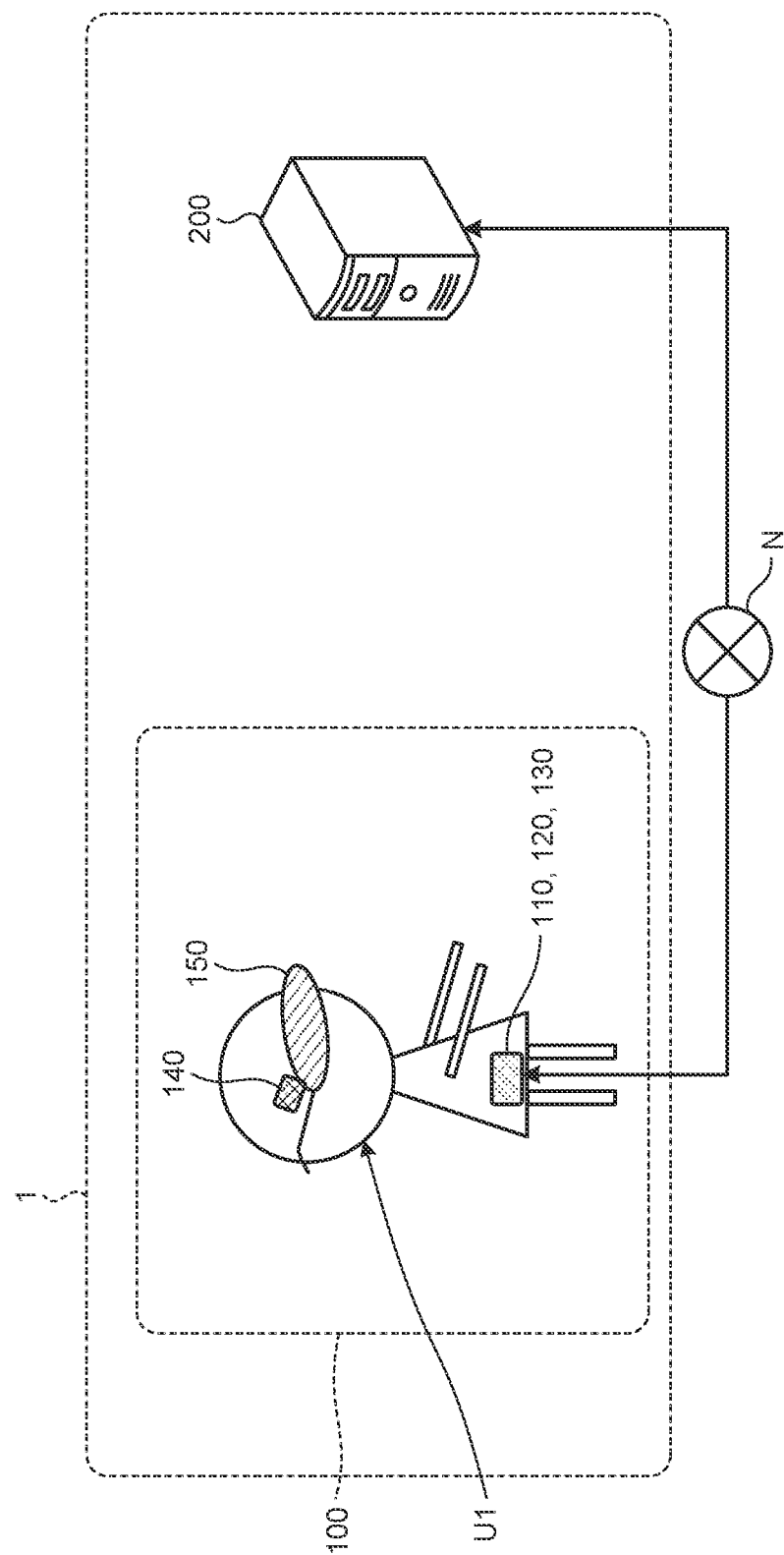

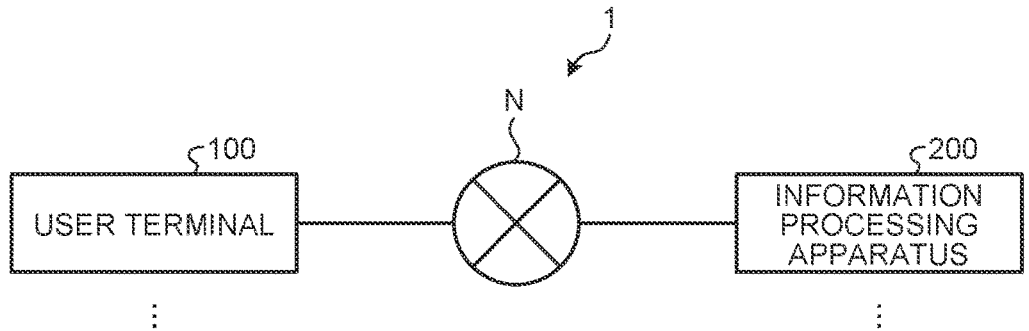
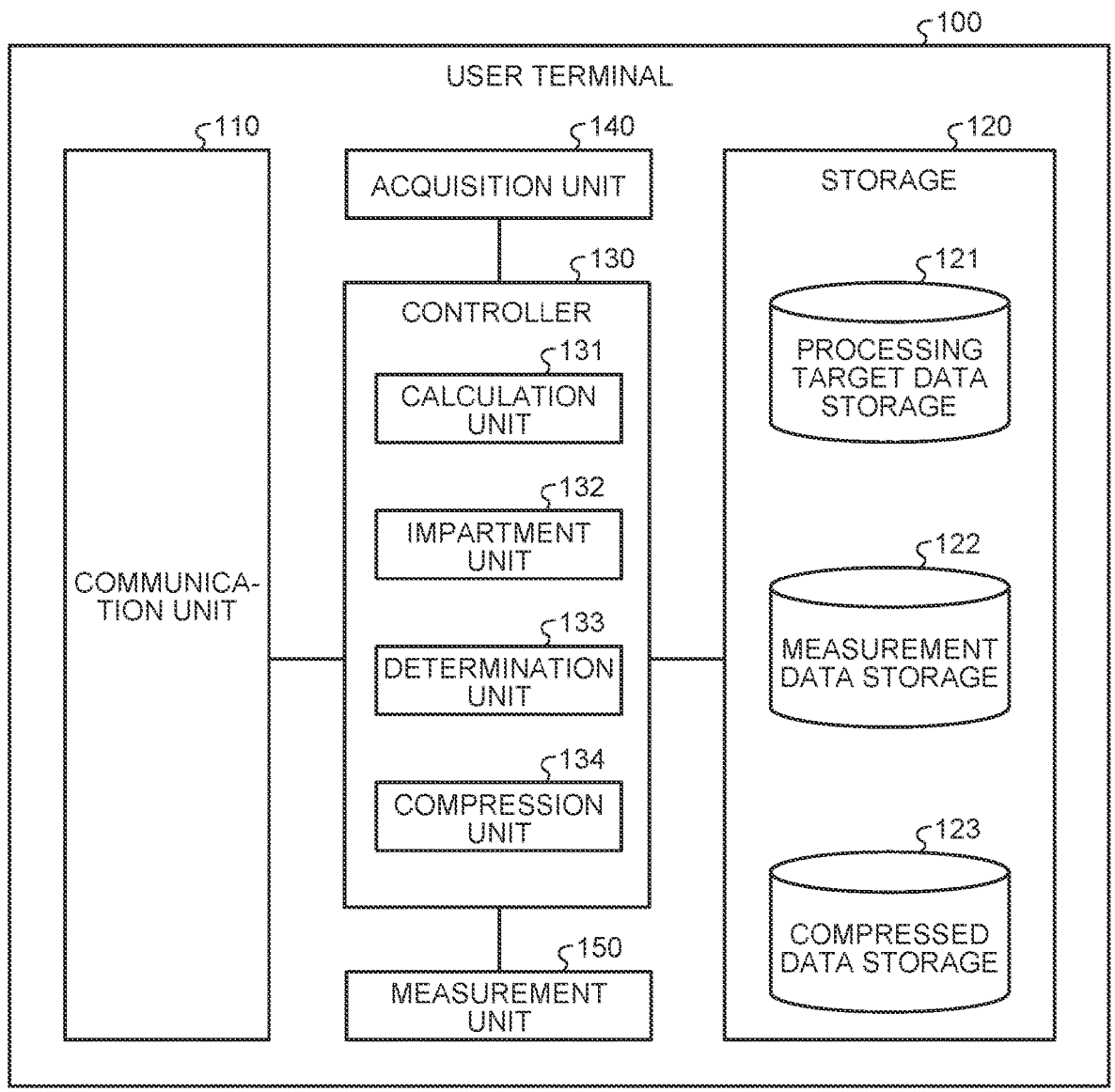

FIG.4
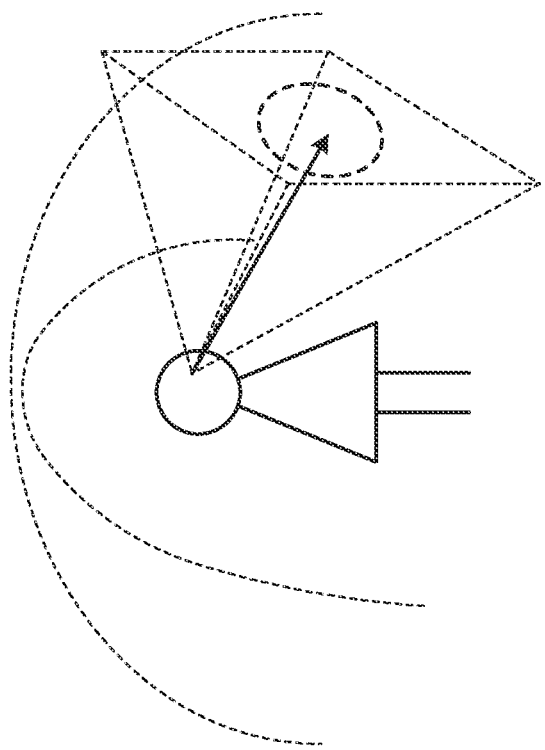
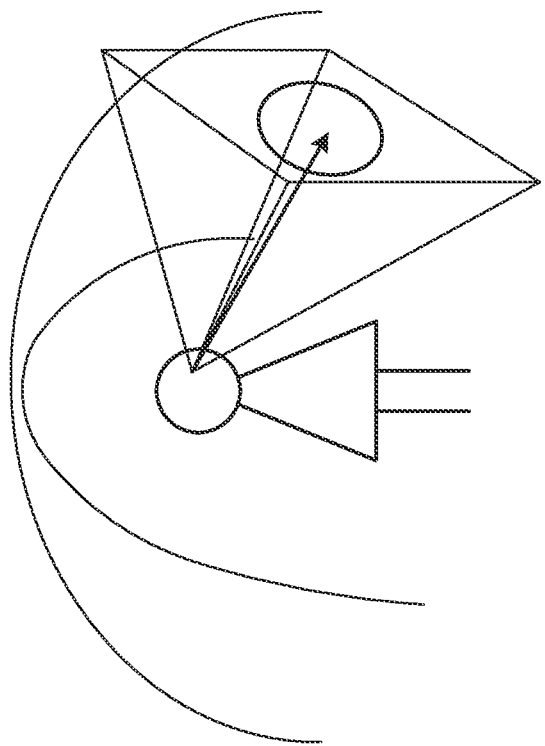

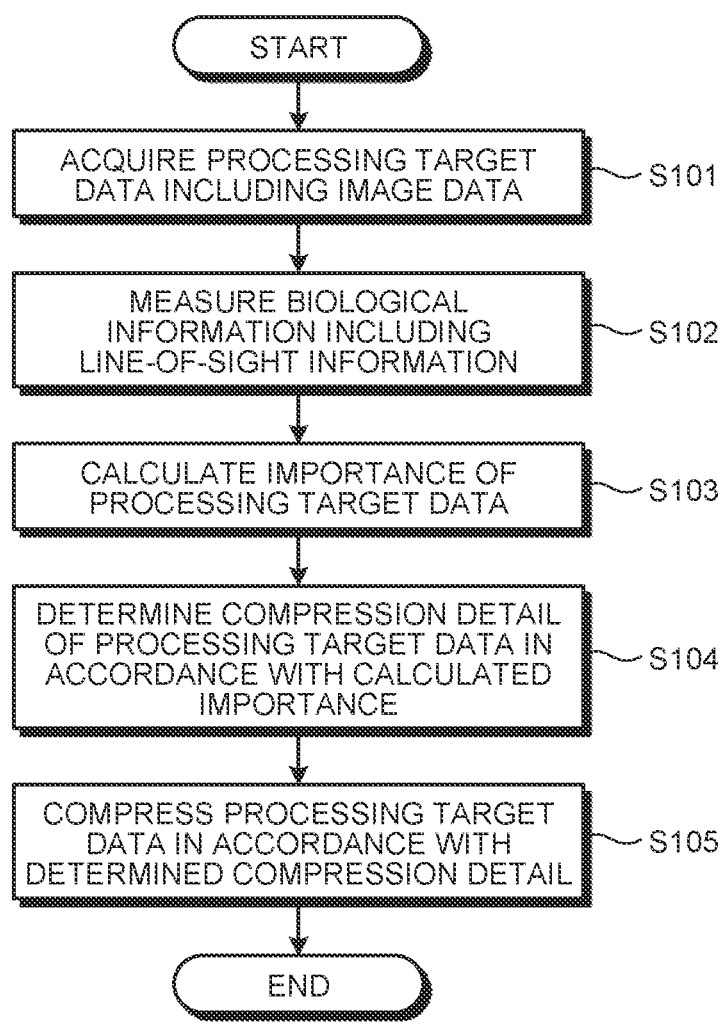

USER TERMINAL, DATA PROCESSING METHOD, AND NON-TRANSITORY STORAGE MEDIUM

CROSS-REFERENCE TO RELATED APPLICATIONS

This application is a Continuation of PCT International Application No. PCT/JP2022/025372 filed on Jun. 24, 2022 which claims the benefit of priority from Japanese Patent Application No. 2021-149566 filed on Sep. 14, 2021, the entire contents of both of which are incorporated herein by reference.

BACKGROUND OF THE INVENTION

The present application relates to a user terminal, a data processing method, and a non-transitory storage medium.

In recent years, to provide high-definition and high-quality image information and audio information to users, a need to handle a huge amount of data is increasing. In contrast, data storage capacity and a data transfer capacity are limited. Therefore, an image compression technology and an audio compression technology need to be further improved.

For example, Japanese Laid-open Patent Publication No. 2008-233765 discloses an image display apparatus that derives a line-of-sight position of an observer on a display unit that displays an image, converts image data in accordance with a first region that surrounds the derived line-of-sight position, a second region with a different magnification rate from the first region, and a third region that is arranged between the first region and the second region and in which the magnification rate is continuously changed, and displays the converted image data on the display unit.

However, while the image display apparatus disclosed in Japanese Laid-open Patent Publication No. 2008-233765 performs wide-angle conversion on the image data based on the line-of-sight position of the observer, the image display apparatus does not perform compression while changing a compression detail in accordance with needs of a user.

A user terminal, a data processing method, and a non-transitory storage medium are disclosed.

SUMMARY OF THE INVENTION

According to one aspect of the present application, there is provided a user terminal comprising: an acquisition unit configured to acquire processing target data that includes image data; a measurement unit configured to measure, as biological information, line-of-sight information on a user and other biological information on the user other than the line-of-sight information; a calculation unit configured to calculates importance of the processing target data based on the line-of-sight information and the other biological information; a determination unit configured to determine a compression detail of the processing target data in accordance with the calculated importance; and a compression unit configured to compress the processing target data in accordance with the compression detail determined by the determination unit.

According to one aspect of the present application, there is provided a data processing method comprising: acquiring processing target data that includes image data; measuring, as biological information, line-of-sight information on a user and other biological information on the user other than the line-of-sight information; calculating importance of the processing target data based on the line-of-sight information and the other biological information; determining a compression detail of the processing target data in accordance with the calculated importance; and compressing the processing target data in accordance with the determined compression detail.

According to one aspect of the present application, there is provided a non-transitory storage medium that stores a data processing program causing a computer to execute a process comprising: acquiring processing target data that includes image data; measuring, as biological information, line-of-sight information on a user and other biological information on the user other than the line-of-sight information; calculating importance of the processing target data based on the line-of-sight information and the other biological information; determining a compression detail of the processing target data in accordance with the calculated importance; and compressing the processing target data in accordance with the determined compression detail.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 1 is a schematic diagram illustrating a data processing system according to one embodiment;

FIG. 2 is a diagram illustrating a configuration example of the data processing system according to one embodiment;

FIG. 3 is a diagram illustrating a configuration example of a user terminal according to a first embodiment;

FIG. 4 is a schematic diagram schematically illustrating a degree of concentration of a user;

FIG. 9 is a flowchart illustrating a process performed by a data processing system as one example of the data processing according to one embodiment.

DETAILED DESCRIPTION OF THE INVENTION

Figure 5:
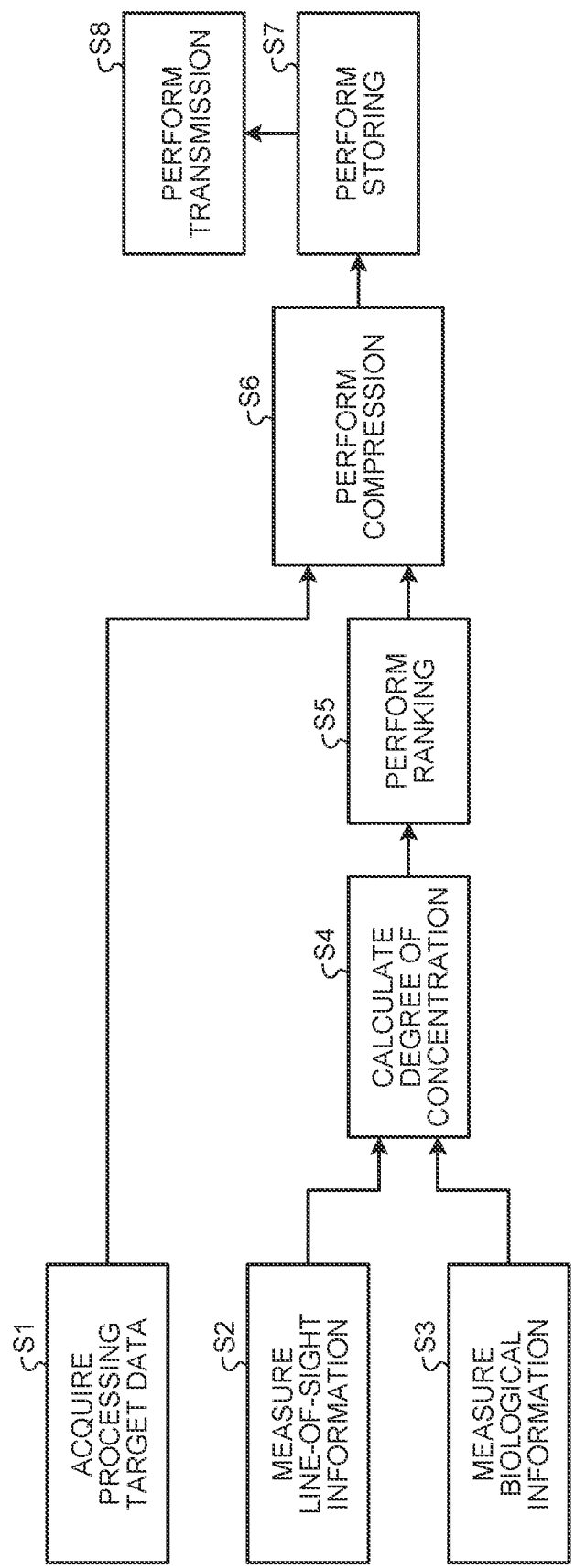
FIG. 5 is a flowchart illustrating an example of data processing according to one embodiment.

Modes (hereinafter, described as "embodiments") for carrying out a user terminal, a data processing method, and a non-transitory storage medium according to the present application will be described in detail below with reference to the drawings. Meanwhile, the user terminal, the data processing method, and the non-transitory storage medium according to the present application are not limited by the embodiments below.

First Embodiment

A configuration of a data processing system 1 according to one embodiment will be first briefly described below with reference to FIG. 1. Meanwhile, details of the configuration of the data processing system 1 will be described later. As illustrated in FIG. 1, the data processing system 1 includes a user terminal 100 and an information processing apparatus 200, and the user terminal 100 and the information processing apparatus 200 are communicably connected to each other via a network N. The user terminal 100 includes a communication unit 110, a storage 120, a controller 130, an acquisition unit 140, and a measurement unit 150. The acquisition unit 140 acquires processing target data that includes image data, and the measurement unit 150 measures biological information that includes line-of-sight information on a user.

Data Processing System

A configuration of the data processing system according to one embodiment will be described below with reference to FIG. 2. FIG. 2 is a diagram illustrating a configuration example of the data processing system according to one embodiment. As illustrated in FIG. 2, the data processing system 1 includes the user terminal 100 and the information processing apparatus 200. Meanwhile, the data processing system 1 illustrated in FIG. 2 may include multiple user terminals 100 and multiple information processing apparatuses 200. Here, the user terminal 100 and the information processing apparatus 200 are communicably connected to one another in a wired or a wireless manner via a predetermined communication network (the network N).

The user terminal 100 is an information processing terminal that is used by a user. The user terminal 100 may be an information processing terminal, such as a wearable computer, a smartphone, a tablet terminal, a desktop Personal Computer (PC), a notebook PC, a mobile phone, or a Personal Digital Assistant (PDA). Meanwhile, in the example illustrated in FIG. 1, a case is illustrated in which the user terminal 100 is a wearable computer.

The information processing apparatus 200 may be, for example, an information processing apparatus, such as a PC, a Work Station (WS), or a computer that has a function of a server. The information processing apparatus 200 performs processing based on information that is transmitted from the user terminal 100 via the network N.

A configuration of the user terminal 100 according to the first embodiment will be described below with reference to FIG. 3. FIG. 3 is a diagram illustrating a configuration example of the user terminal according to the first embodiment. As illustrated in FIG. 3, the user terminal 100 includes the communication unit 110, the storage 120, the controller 130, the acquisition unit 140, and the measurement unit 150. Meanwhile, although not illustrated in FIG. 3, the user terminal 100 may include an input unit (for example, a keyboard, a mouse, or the like) that receives various kinds of operation from a user, or a display (for example, a liquid crystal display or the like) for displaying various kinds of information.

Communication Unit 110

The communication unit 110 is implemented by, for example, a Network Interface Card (NIC) or the like. Further, the communication unit 110 is connected to the network N in a wired or a wireless manner, and transmits and receives information to and from the information processing apparatus 200.

Storage 120

The storage 120 is implemented by, for example, a semiconductor memory device, such as a Random Access Memory (RAM) or a flash memory, or a storage device, such as a hard disk, a Solid State Drive (SSD), or an optical disk. As illustrated in FIG. 3, the storage 120 includes a processing target data storage 121, a measurement data storage 122, and a compressed data storage 123.

Processing Target Data Storage 121

The processing target data storage 121 stores therein processing target data that is acquired by the acquisition unit 140 (described later). For example, if the acquisition unit 140 is a camera, the processing target data storage 121 stores therein image data that is acquired by the acquisition unit 140. Further, if the acquisition unit 140 is a microphone, the processing target data storage 121 stores therein audio data that is acquired by the acquisition unit 140.

Measurement Data Storage 122

The measurement data storage 122 stores therein data that is measured by the measurement unit 150 and data that is analyzed by the measurement unit 150 (described later). For example, if the measurement unit 150 is an electrooculography sensor, a measurement value of electrooculography of a user measured by the electrooculography sensor and line-of-sight information that is based on analysis of the measurement value are stored. Further, for example, if the measurement unit 150 is a line-of-sight detection camera, imaging data of a line of sight of the user captured by the line-of-sight detection camera and line-of-sight information that is based on analysis of the imaging data are stored. Furthermore, for example, if the measurement unit 150 is an electro dermal activity sensor, a state of an electro dermal activity of the user measured by the electro dermal activity sensor is stored. Moreover, for example, if the measurement unit 150 is a pulse wave sensor, pulse waves of the user measured by the pulse wave sensor are stored.

Compressed Data Storage 123

The compressed data storage 123 stores therein processing target data that is compressed by a compression unit 134 (described later). For example, if the processing target data is image data, image data that is compressed by MPEG is stored. Further, if the processing target data is audio data, audio data that is compressed by MPEG-1 Audio Layer-3 (MP3) is stored.

Acquisition Unit 140

The acquisition unit 140 acquires processing target data that includes image data. For example, the acquisition unit 140 may be a camera and may acquire image data around the user. The camera includes an optical element and an imaging element. The optical element is an element, such as a lens, a mirror, a prism, or a filter, that constitutes an optical system, for example. The imaging element is an element that converts light that is input via the optical element to an image signal that is an electrical signal. The imaging element is, for example, a Charge Coupled Device (CCD) sensor, a Complementary Metal Oxide Semiconductor (CMOS) sensor, or the like.

Furthermore, the acquisition unit 140 may be a microphone, and may acquire audio data around the user. The microphone is audio equipment that receives sound that is air vibration by a diaphragm or the like, and converts the vibration to an electrical signal.

Measurement Unit 150

The measurement unit 150 measures biological information. The measurement unit 150 measures, as the biological information, the line-of-sight information and different biological information that is biological information other than the line-of-sight information. The measurement unit 150 that detects the line-of-sight information may be, for example, an electrooculography sensor and may measure electrooculography of the user. The electrooculography sensor is a sensor that measures a potential difference that occurs between a corneal side and a retinal side of an eyeball. In general, the corneal side of the eyeball of a human has a positive charge and the retinal side has a negative charge, and therefore, a potential difference occurs between the corneal side and the retinal side. When the potential difference is measured by attaching an electrode on a skin around an eye, the potential difference varies depending on eye movement or a blink, so that, by measuring the potential difference, it is possible to recognize the eye movement, that is, a direction of a line of sight.

Further, the measurement unit 150 that detects the line-of-sight information may be a line-of-sight detection camera. The line-of-sight detection camera is a camera that captures an image of an eye of a user. The line-of-sight detection camera may include an analysis unit that detects a line of sight by performing image analysis on imaging data of the eye of the user. For example, the analysis unit of the line-of-sight detection camera may detect a direction of the line of sight from the imaging data of the eye of the user based on a positional relationship of a moving point (an outer edge of an iris) with reference to a characteristic portion (for example, an inner corner of the eye or an outer corner of the eye) of a face or the eye.

Furthermore, the measurement unit 150 that detects the different biological information may be an Electro Dermal Activity (EDA) sensor that detects a state of an electro dermal activity as the different biological information. The electro dermal activity sensor measures the state of the electro dermal activity due to sweat secreted from sweat glands in a skin (for example, eccrine glands). The electro dermal activity is roughly classified into skin potential and skin conductance. The skin potential is distinguished into a skin potential level and a skin potential reflex. The skin potential level is a direct-current component of the skin potential, which indicates a negative high value when an arousal level is high and indicates a positive value in a sleepy state or a relaxed state. The skin potential reflex is an alternating-current component of the skin potential, and the skin potential reflex frequently occurs at a time of occurrence of a stimulation in a sense of pain, a sense of touch, a sense of hearing, or a sense of sight, at a time of deep breath, at a time of body movement, at a time of mental arithmetic, or at a time of thinking. Therefore, it is possible to estimate a degree of concentration of the user from the state of the electro dermal activity.

Moreover, the measurement unit 150 that detects the different biological information may be a pulse wave sensor that detects pulse wave information as the different biological information. The pulse wave sensor is a sensor that captures, as a waveform, a change of a blood vessel volume that occurs when a heart pumps blood. The pulse wave sensor emits infrared light, red light, or light at a green wavelength at around 550 nanometers (nm) to a living body, and measures light that is reflected inside the living body by using a photodiode or a phototransistor. In the blood in an artery, oxygenated hemoglobin is present and has a characteristics of absorbing incident light, and therefore, by chronologically measuring blood volumes (a change of a blood vessel capacity) that changes with heart pulsation, it is possible to obtain a pulse wave signal.

Controller 130

The controller 130 is implemented by causing a Central Processing Unit (CPU), a Micro Processing Unit (MPU), or the like to execute various kinds of programs that are stored in a storage device of the user terminal 100, by using a RAM as a work area. Further, the controller 130 may be implemented by, for example, an integrated circuit, such as an Application Specific Integrated Circuit (ASIC) or a Field Programmable Gate Array (FPGA).

As illustrated in FIG. 3, the controller 130 includes a calculation unit 131, an impartment unit 132, a determination unit 133, and the compression unit 134. Meanwhile, the calculation unit 131, the impartment unit 132, the determination unit 133, and the compression unit 134 included in the controller 130 need not always be included in the controller 130, and it is sufficient that at least one of the controller 130 of the user terminal 100 and a controller 230 of the information processing apparatus 200 includes each of the units.

Calculation Unit 131

The calculation unit 131 controls the measurement unit 150 to cause the measurement unit 150 to detect the line-of-sight information and the different biological information and store the line-of-sight information and the different biological information that are detected by the measurement unit 150 in the measurement data storage 122. The calculation unit 131 reads, from the measurement data storage 122, the line-of-sight information and the different biological information, and calculates importance of processing target data based on the line-of-sight information and the different biological information. First, the calculation unit 131 calculates a degree of concentration based on the line-of-sight information and a degree of concentration based on the different biological information other than the line-of-sight information in a manner as described below.

First, the degree of concentration based on the line-of-sight information is obtained by first obtaining a movement status (a moving distance or acceleration) of a line of sight of a user at a usual time, and calculating a change of the movement status (a difference in the moving distance or a difference in the acceleration) of the line of sight at a time of concentration. Specifically, if the movement status of the line of sight of the user decreases as compared to the movement status of the line of sight at a usual time, it is calculated that the degree of concentration is increased. Furthermore, if the movement status of the line of sight of the user increases as compared to the movement status of the line of sight at a usual time, it is calculated that the degree of concentration is decreased. FIG. 4 is a schematic diagram schematically illustrating the degree of concentration of the user. As illustrated in the left side in FIG. 4, if the movement status of the line of sight of the user is low and a visible range of the user is fixed, it is calculated that the degree of concentration of the user is high. Further, as illustrated in the right side in FIG. 4, if the movement status of the line of sight of the user is high and the visible range of the user is not fixed, it is calculated that the degree of concentration of the user is low. Specifically, for example, the concentration may be calculated such that the degree of concentration of the user decreases with an increase in the movement status of the line of sight of the user.

Furthermore, the degree of concentration based on the different biological information is calculated by measuring a change between the biological information on the user at a usual time and the biological information at a time of concentration, and it is calculated that the degree of concentration is increased or decreased if a numerical value is increased or decreased as compared to those at a usual time. For example, assuming that the biological information at a usual time is represented by 0% and the biological information is increased by 1% and 3% and decreased by 1% and 3%, it may be possible to calculate that the degree of concentration is increased or decreased on a scale of one to five while adopting the degree of concentration at a middle level as the degree of concentration at a usual time. For example, if the different biological information is pulse waves that are measured by the pulse wave sensor, the degree of concentration is calculated based on an interval between peak waves in pulse waves. Specifically, to calculate the degree of concentration from the pulse waves, a variation of the interval between the peak waves in the pulse waves is calculated. Meanwhile, at a cellular level, the heart rate is repetition of depolarization (action potential) and repolarization (resting potential), and it is possible to generate an electrocardiogram by measuring this electrical activity from a body surface. A time span between adjacent peaks R in waveforms of the electrocardiogram is an R-R interval. The pulse waves are transmitted through the entire body approximately at the same time as the heart rate activity of the heart, and therefore, it is possible to assume that the heart rate is synchronized with the pulse waves. The peak waves of the pulse waves are synchronized with the R waves of the electrocardiogram, and therefore, it is possible to assume that the interval between the peak waves in the pulse waves is equivalent to the R-R interval in the electrocardiogram. The variation of the interval between the peak waves in the pulse waves may be regarded as a temporal differential value, and therefore, it is possible to determine a degree of activation or a degree of calming down of autonomic nerves of a living body by calculating the differential value and detecting a magnitude of variation. Specifically, it is possible to determine the degree of concentration from the differential value. For example, it may be possible to calculate the degree of concentration such that the degree of concentration decreases with an increase in the differential value (the variation of pulse waves). Furthermore, for example, if the different biological information is a state of the electro dermal activity that is measured by the electro dermal activity sensor, it may be possible to calculate the degree of concentration based on whether the skin potential level is positive or negative or based on a frequency of the skin potential reflect or the like.

The calculation unit 131 calculates, after calculating the degree of concentration based on the line-of-sight information and the degree of concentration based on the different biological information, a degree of concentration CT of the user based on Expression (1) below. Here, CT1 in Expression (1) represents the degree of concentration based on the line-of-sight information, and CT2 represents the degree of concentration based on the different biological information. Meanwhile, CT2 in Expression (1) may be a degree of concentration based on a single piece of the different biological information or a degree of concentration based on multiple pieces of the different biological information.

$$CT = CT_1 + CT_2 \qquad (1)$$

The calculation unit 131 calculate, after calculating the degree of concentration CT of the user based on Expression (1), importance of the processing target data. For example, the calculation unit 131 may classify the degree of concentration CT of the user into five levels, may set five levels of the importance of the processing target data in association with the five levels of the degree of concentration CT of the user, and may calculate the importance of the processing target data on a scale of one to five in accordance with the degree of concentration CT of the user. Meanwhile, the calculation unit 131 calculates the importance such that the importance of the processing target data increases with an increase in the degree of concentration CT of the user.

The calculation unit 131 calculates the importance on a scale of one to three or more for each predetermined unit of the processing target data based on the line-of-sight information and the different biological information. For example, if the processing target data is image data, the calculation unit 131 may adopt a Macroblock (MB) as a predetermined unit, divide image data corresponding to a single image into MBs, and calculate the importance for each of the MBs. Specifically, for example, the importance of an MB that is expected to be viewed by the user in a concentrated manner among the MBs is calculated as the highest importance. For example, the calculation unit 131 calculates the importance as a high importance for an MB that is located in a direction of the line of sight of the user based on the line-of-sight information on the user. Specifically, the importance is calculated based on Expression (2) below. Here, IMP in Expression (2) represents the importance and K represents a weighting factor.

$$IMP = CT_1 \times K + CT_2 \times K \qquad (2)$$

Specifically, the calculation unit 131 calculates a higher importance by increasing the weighting factor K when calculating the importance of the MB that is located in the direction of the line of sight of the user. For example, the weighting factor may be set such that the weighting factor decreases as the MB deviates from the direction of the line of sight, such that the weighting factor is set to 5 for an MB that is located within a range of ±0.25° in the direction of the line of sight, and the weighting factor is set to 4 for an MB that is located in a range equal to or larger than −0.5° and smaller than −0.25° and in a range larger than 0.25° and equal to or smaller than 0.5° in the direction of the line of sight. Meanwhile, the values of the weighting factor as described above are mere examples, and it is possible to set an arbitrary value. Further, in Expression (2), the weighting factor K that is common to the degree of concentration CT1 and the degree of concentration CT2 is set, but embodiments are not limited to this example. It may be possible to set a different weighting factor K for each of the degrees of concentration CT1 and CT2, such as a weighting factor K1 for the degree of concentration CT1 and a weighting factor K2 for the degree of concentration CT2. Furthermore, the calculation unit 131 may change the weighting factor K (or the weighting factors K1 and K2) in accordance with operation that is received by an input unit. Moreover, if the processing target data is audio data, the calculation unit 131 may calculate the importance at predetermined time intervals.

Impartment Unit 132

The impartment unit 132 imparts the importance that is calculated by the calculation unit 131 to each predetermined unit of the processing target data. For example, the impartment unit 132 may impart the importance that is calculated by the calculation unit 131, as tag information, to user data that can be set for each picture in data that is compressed by the MPEG compression method. Since syntax of MPEG includes a start code called user_start_code which can be uniquely coded by Huffman coding and which is a region into which 32-bit data is input, and it is possible to impart the importance, as the tag information, in this region.

Furthermore, the impartment unit 132 may packetize an elementary stream, such as an MPEG video or audio, add a header or an ID, and multiplex only the tag information as an independent elementary stream by using syntax of "MPEG system layer" for multiplexing in a predetermined unit.

Determination Unit 133

The determination unit 133 determines a compression ratio (compression detail) of the processing target data in accordance with the importance. The determination unit 133 determines the compression ratio such that the compression ratio decreases with an increase in the importance. For example, if the calculation unit 131 has calculated the importance on a scale of one to five, such as a "level 5", a "level 4", a "level 3", a "level 2", and a "level 1" in descending order, the determination unit 133 may determine the compression ratios as 5%, 10%, 158, 20%, and 30% in order of the highest importance. Meanwhile, the values of the compression ratio corresponding to the importance as described above are mere examples, and it is possible to determine an arbitrary value as the compression ratio in accordance with the importance. Furthermore, while it is explained that the determination unit 133 determines the compression ratio of the processing target data in accordance with the importance, embodiments are not limited to this example, and it may be possible to determine a compression detail, such as the compression ratio, a volume of compressed data, or distortion.

Moreover, the determination unit 133 determines the compression ratio for each predetermined unit of the processing target data based on the importance that is imparted to each predetermined unit of the processing target data. Specifically, for example, if the importance of a unit A of the processing target data is the "level 5", the determination unit 133 may determine the compression ratio as 5% for the unit A, and if the importance of a unit B of the processing target data is the "level 2", the determination unit 133 may determine the compression ratio as 20% for the unit B.

Compression Unit 134

The compression unit 134 compresses the processing target data in accordance with the compression ratio that is determined by the determination unit 133. The compression unit 134 may compress the processing target data by using a compression technology, such as MPEG, that is internationally standardized. Meanwhile, MPEG is a technology in which a several technologies are combined. In an input image of the compression unit 134, a temporally redundant part is removed by obtaining a difference between an image that is coded by a motion compensation predictor and the input image. As a prediction direction, three modes, such as past, future, and past and future, are present, and the modes are used in a switching manner for each MB of 16×16 pixels. In motion compensation, pattern matching is performed for each MB as a motion region, a motion vector is detected with a half-pixel accuracy, and motion is predicted by performing shifting by an amount corresponding to motion. A difference image is subjected to Discrete Cosine Transform (DCT) in which integral transform with a cosine function as an integral kernel is transformed to a limited space. In MPEG, an MB is divided into four blocks, and two-dimensional DCT is performed on a DCT block of 8×8. In general, a video signal includes a large amount of low-frequency components and a small amount of high-frequency components, and therefore, if DCT is performed, DCT coefficients are concentrated in the low-frequency components. The image data (DCT coefficient) that is subjected to DCT is subjected to quantization. The quantization is performed by dividing the DCT coefficient by a quantization value obtained by multiplying a quantization matrix, in which two-dimensional frequencies of 8×8 are weighted by visual characteristics, by a quantization scale for scalar multiplication of the entire quantization matrix.

The quantized data is subjected to variable length coding. A direct-current component among the quantized values is coded by using Differential Pulse Code Modulation (DPCM) that is one of predictive codings. Meanwhile, the DPCM is a coding method for performing Pulse Code Modulation (PCM) on a difference between signals. Further, for an alternating-current component, a Zigzag scan from a low-frequency range to a high-frequency range is performed, and Huffman coding is performed in which a shorter bit length is assigned as a probability of data appearance is higher with a zero run length and an effective coefficient value being adopted as a single event. The data that is subjected to variable length coding is temporarily stored in a buffer and output as coded data. Furthermore, as for a generated code amount in each of MBs of data to be output, the code amount is controlled by a value for the scalar multiplication when the quantization is performed for each of the MBs. This value can be set for each MB of 16×16 pixels in an image. Therefore, the code amount can be controlled by adjusting the quantization scale while checking the generated code amount with respect to a target code amount.

Similarly, it may be possible to control image quality for each MB of an image by increasing the image quality by reduction of the quantization scale for the image of the MB corresponding to a position of the image in which the line of sight is oriented, and increasing the quantization scale of the other portions.

Furthermore, before compression of the image, it may be possible to perform MPEG compression while maintaining the image quality of the entire image for a scene in which the line of sight is fixed to some extent by using a low-pass filter that enables to change a frequency band in the entire frame, and reducing information entropy of the entire image by moving setting of the low-pass filter to a direction in which the frequency band is limited (a direction in which resolution is reduced) for other scenes.

Data processing according to one embodiment will be described below in accordance with a flowchart in FIG. 5. FIG. 5 is a flowchart illustrating an example of the data processing according to one embodiment. The user terminal 100 acquires the processing target data that includes image information (Step S1). The user terminal 100 measures the line-of-sight information on the user (Step S2). The user terminal 100 measures the biological information on the user (Step S3). The user terminal 100 calculates the degree of concentration of the user based on the line-of-sight information and the different biological information (Step S4). The user terminal 100 ranks the importance of the processing target data in accordance with the calculated degree of concentration (Step S5). The user terminal 100 determines a compression detail in accordance with the importance of the processing target data, and compresses the processing target data in accordance with the determined compression detail (Step S6). The user terminal 100 stores the compressed processing target data (Step S7). The user terminal 100 transmits the compressed processing target data to the information processing apparatus 200 (Step S8). The information processing apparatus 200 stores the received compressed processing target data.

As described above, the user terminal 100 according to the first embodiment estimates the importance of the processing target data based on the line-of-sight information and the different biological information such as a pulse wave, and determines the compression detail based on the importance. Specifically, the user terminal 100 estimates whether the user recognizes something as important based on the biological information and determines the compression detail in accordance with the estimation, so that it is possible to appropriately compress data in accordance with needs of the user.

Second Embodiment

Figure 6:
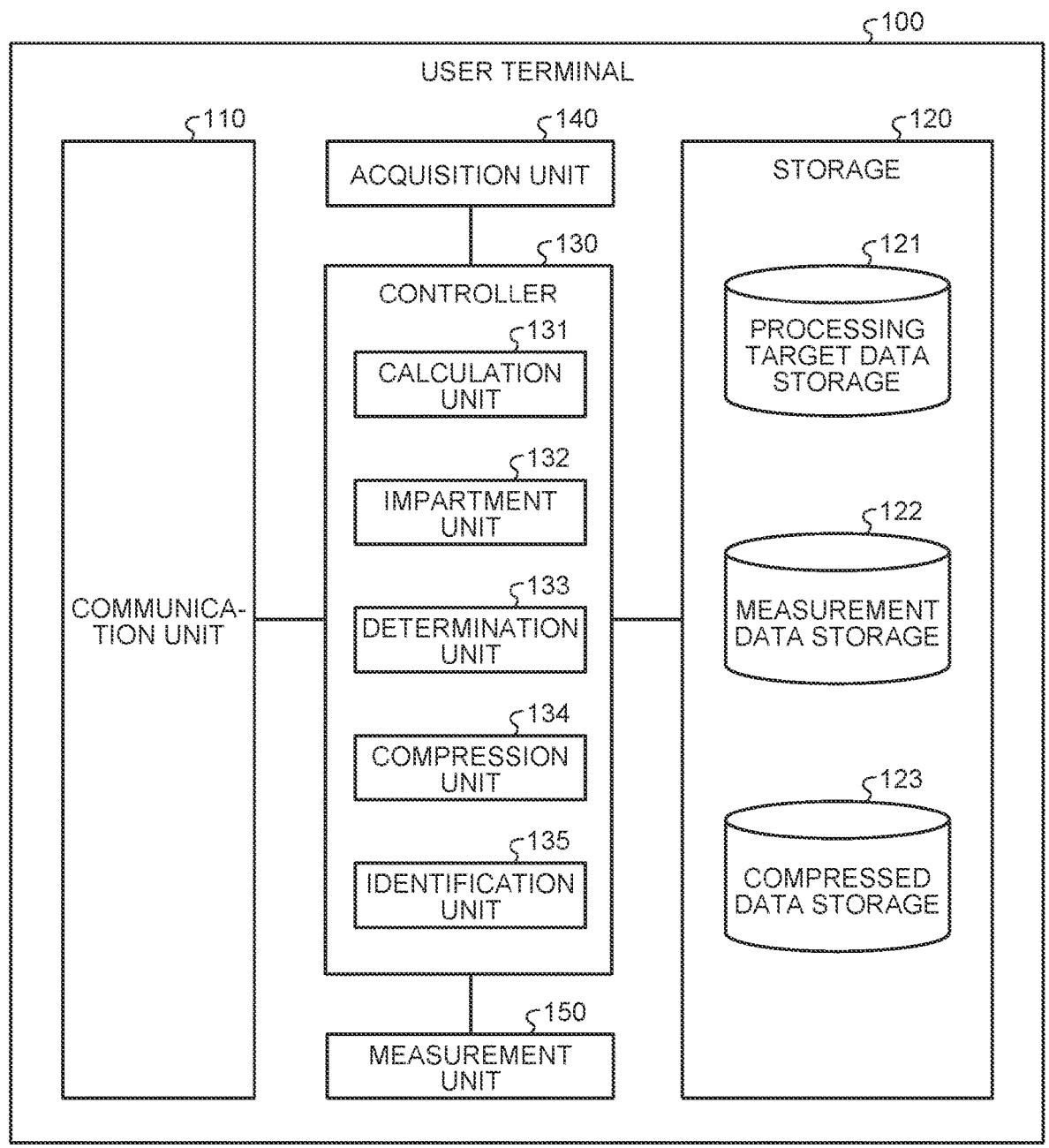
FIG. 6 is a diagram illustrating a configuration example of a user terminal according to a second embodiment.

A configuration of the user terminal 100 according to a second embodiment will be described below with reference to FIG. 6. FIG. 6 is a diagram illustrating a configuration example of the user terminal according to the second embodiment. As illustrated in FIG. 6, the user terminal 100 according to the second embodiment further includes an identification unit 135 as the components of the controller 130 of the user terminal 100 according to the first embodiment. Meanwhile, in the configuration of the user terminal 100 according to the second embodiment, explanation of the same components as those of the configuration of the user terminal 100 according to the first embodiment will be omitted. The user terminal 100 according to the second embodiment is the same as the user terminal 100 according to the first embodiment except that the calculation unit 131 performs a different process and the identification unit 135 is added as compared to the user terminal 100 according to the first embodiment. Therefore, processes performed by the calculation unit 131 and the identification unit 135 will be described below.

The identification unit 135 analyzes the processing target data and determines a situation of a user. For example, the identification unit 135 may analyze the processing target data by applying a trained model, which is trained by using training data which composes the processing target data to which an annotation label is imparted for each situation of the user, to the processing target data, and identify the situation of the user. Here, the situation of the user includes, for example, various scenes which the user encounters in daily life, such as a situation in which the user looks at a mountain scenery or a situation in which the user is having a business meeting with a business partner.

The calculation unit 131 calculates the importance in accordance with the situation that is identified by the identification unit 135. The calculation unit 131 objectively determines whether the determined situation is important for the user, and the calculation unit 131 calculates the importance such that the importance is increased when it is determined that the situation is important. Specifically, the calculation unit 131 calculates the importance of the processing target data while changing a weighting factor that is used for calculation of the importance of the processing target data, in accordance with the situation that is identified by the identification unit 135. For example, if the situation that is identified by the identification unit 135 indicates a situation in which the user is having a business meeting with a business partner, the calculation unit 131 calculates the importance of the processing target data while increasing the weighting factor. Further, for example, if the situation that is identified by the identification unit 135 indicates a situation in which the user looks at a mountain scenery, the calculation unit 131 calculates the importance of the processing target data while decreasing the weighting factor. In this manner, the calculation unit 131 calculates the importance of the processing target data while changing the weighting factor in accordance with the situation that is identified by the identification unit 135.

In this manner, in the second embodiment, the importance is calculated based on the situation of the user in addition to the biological information. Therefore, it is possible to more appropriately compress data in accordance with needs of the user.

Third Embodiment

A configuration of a user terminal according to a third embodiment will be described below with reference to FIG. 6. Meanwhile, in the configuration of the user terminal 100 according to the third embodiment, explanation of the same components as those of the configuration of the user terminal 100 according to the first embodiment will be omitted. The user terminal 100 according to the third embodiment is the same as the user terminal 100 according to the first embodiment except that the calculation unit 131 performs a different process and the identification unit 135 is added, as compared to the user terminal 100 according to the first embodiment. Further, the third embodiment may be combined with the second embodiment.

Figure 7:
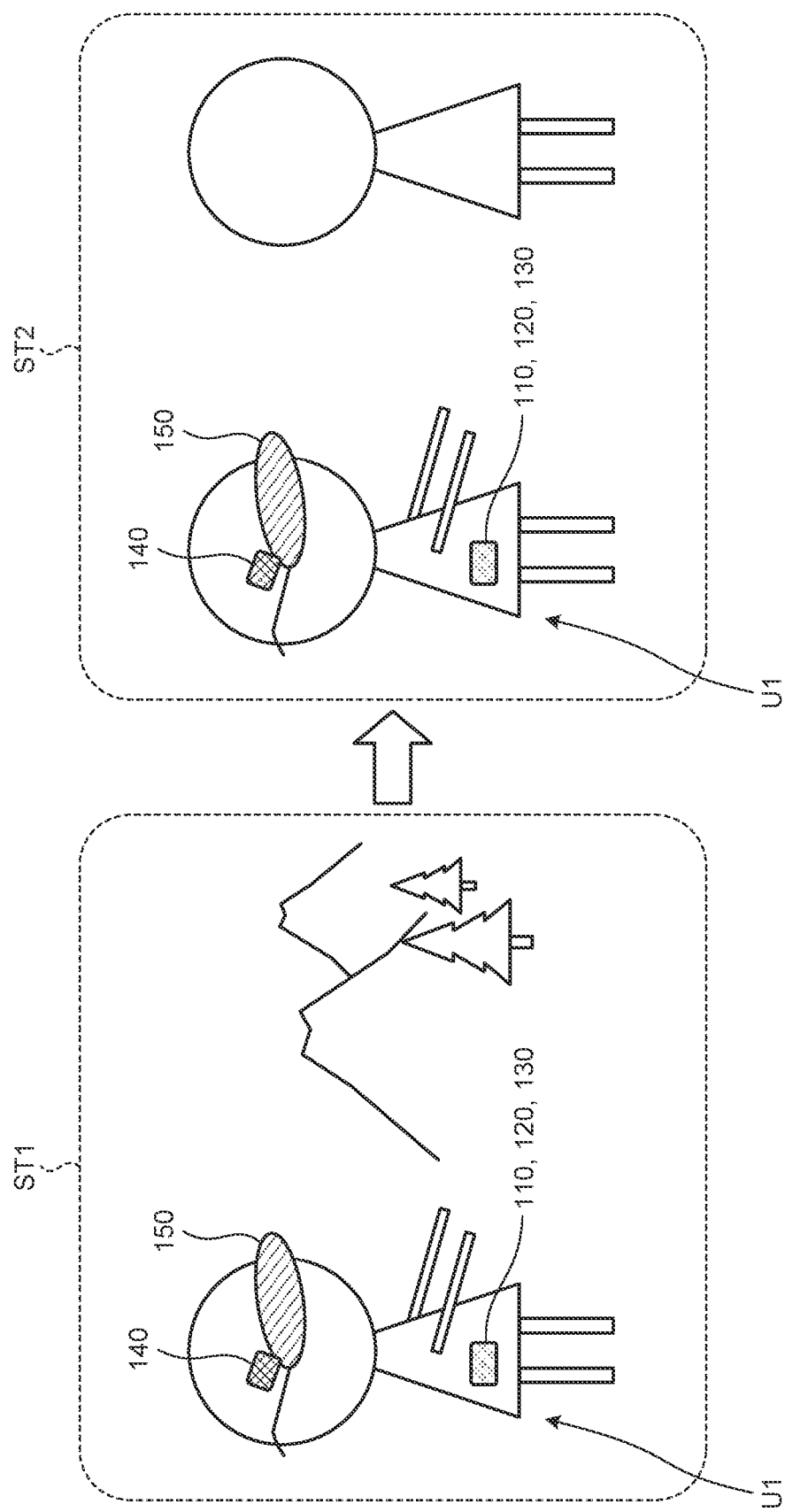
FIG. 7 is a schematic diagram schematically illustrating a change of a situation of a user.

The identification unit 135 analyzes the processing target data and identifies a change of the situation of the user. For example, the identification unit 135 may analyze the processing target data by applying a trained model, which is trained by using training data which comprises the processing target data to which an annotation label is imparted for each situation of the user, to the processing target data, and identify a change of the situation of the user. A change of the situation will be described below with reference to FIG. 7. FIG. 7 is a schematic diagram schematically illustrating a change of the situation of the user. Specifically, a change of the situation of the user indicates, as illustrated in FIG. 7 for example, a change from a situation ST1 in which a user U1 looks at a mountain scenery to a situation ST2 in which the user U1 is having a business meeting with a business partner.

The calculation unit 131 calculates the importance of the processing target data based on a change of the situation in the processing target data, in addition to the line-of-sight information and the different biological information. Specifically, the calculation unit 131 calculates the importance such that when the processing target data corresponds to a portion that represents a change of the situation, the importance of the corresponding processing target data is increased. More specifically, when the processing target data corresponds to a portion that represents a change of the situation, the calculation unit 131 calculates the importance of the processing target data while increasing a weighting factor that is used for calculation of the importance of the portion representing the change of the situation such that the importance is increased.

In this manner, in the third embodiment, it is possible to perform calculation such that the importance of the processing target data corresponding to the portion that represents the change of the situation of the user is increased and a compression ratio of the corresponding portion in the processing target data is reduced. Therefore, when the user checks the processing target data, by increasing data quality of the portion in which the situation is changed and which serves as a start portion, and determining a compression ratio for other portions in accordance with the importance based on the degree of concentration, it is possible to ensure the data quality and reduce a data volume at the same time.

Information Processing Apparatus

Figure 8:
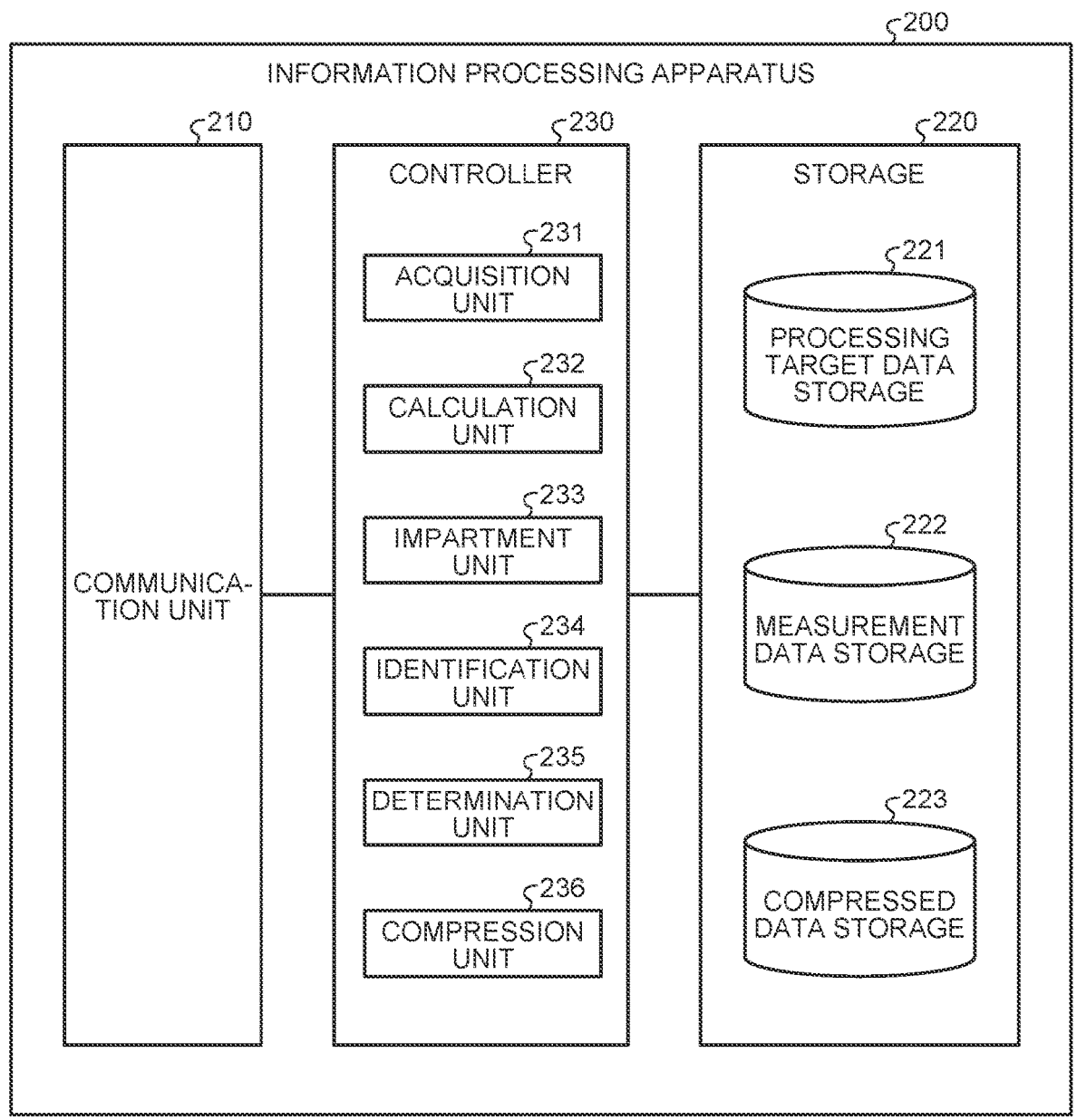
FIG. 8 is a diagram illustrating a configuration example of an information processing apparatus according to one embodiment.

In the explanation as described above, the user terminal 100 sets the importance based on the degree of concentration and compresses the image data based on the importance. However, the processes performed by the user terminal 100 may be performed by the information processing apparatus 200. A configuration of the information processing apparatus 200 of this case will be described below with reference to FIG. 8. FIG. 8 is a diagram illustrating a configuration example of the information processing apparatus according to one embodiment. As illustrated in FIG. 8, the information processing apparatus 200 includes a communication unit 210, a storage 220, and the controller 230. Meanwhile, although not illustrated in FIG. 8, the information processing apparatus 200 may include an input unit (for example, a keyboard, a mouse, or the like) that receives various kinds of operation from an administrator of the information processing apparatus 200, or a display (for example, a liquid crystal display or the like) for displaying various kinds of information.

The communication unit 210 is implemented by, for example, a NIC or the like. Further, the communication unit 210 is connected to the network N in a wired or a wireless manner, and transmits and receives information to and from the user terminal 100 via the network N.

The storage 220 is implemented by, for example, a semiconductor memory device, such as a RAM or a flash memory, or a storage device, such as a hard disk, an SSD, or an optical disk. As illustrated in FIG. 8, the storage 220 includes a processing target data storage 221, a measurement data storage 222, and a compressed data storage 223.

The processing target data storage 221 stores therein processing target data that an acquisition unit 231 (described later) has acquired from the user terminal 100. The information that is stored in the processing target data storage 221 is the same as the information that is stored in the processing target data storage 121 included in the user terminal 100, and therefore, explanation of the information that is stored in the processing target data storage 221 will be omitted.

The measurement data storage 222 stores therein measurement data that the acquisition unit 231 (described later) has acquired from the user terminal 100. The information that is stored in the measurement data storage 222 is the same as the information that is stored in the measurement data storage 122 included in the user terminal 100, and therefore, explanation of the information that is stored in the measurement data storage 222 will be omitted.

The compressed data storage 223 stores therein compressed data that the acquisition unit 231 (described later) has acquired from the user terminal 100 or compressed data that is compressed by a compression unit 236 (described later). The information that is stored in the compressed data storage 223 is the same as the information that is stored in the compressed data storage 123 included in the user terminal 100, and therefore, explanation of the information that is stored in the compressed data storage 223 will be omitted.

The controller 230 is implemented by causing a CPU, an MPU, or the like to execute various kinds of programs that are stored in the information processing apparatus 200 by using a RAM as a work area. Further, the controller 230 be implemented by, for example, an integrated circuit, such as an ASIC or an FPGA.

As illustrated in FIG. 8, the controller 230 includes the acquisition unit 231, a calculation unit 232, an impartment unit 233, an identification unit 234, a determination unit 235, and the compression unit 236. Meanwhile, the calculation unit 232, the impartment unit 233, the identification unit 234, the determination unit 235, and the compression unit 236 included in the controller 230 need not always be included in the controller 230, and it is sufficient that at least one of the controller 130 of the user terminal 100 and the controller 230 of the information processing apparatus 200 includes each of the units.

The acquisition unit 231 acquires the processing target data, the measurement data, and the compressed data from the user terminal 100. Meanwhile, if the user terminal 100 performs all of the processes of the controller 130 of the user terminal 100, it is sufficient for the acquisition unit 231 to only acquire the compressed data from the user terminal 100.

The calculation unit 232 performs the same processes as those performed by the calculation unit 131 included in the controller 130 of the user terminal 100, and therefore, explanation of the processes performed by the calculation unit 232 will be omitted. Meanwhile, the calculation unit 232 performs the same processes as those performed by the calculation unit 131 included in the controller 130 of the user terminal 100 only when the acquisition unit 231 acquires the processing target data and the measurement data from the user terminal 100.

The impartment unit 233 performs the same processes as those performed by the impartment unit 132 included in the controller 130 of the user terminal 100, and therefore, explanation of the processes performed by the impartment unit 233 will be omitted. Meanwhile, the impartment unit 233 performs the same processes as those performed by the impartment unit 132 included in the controller 130 of the user terminal 100 only when the acquisition unit 231 acquires the processing target data and the measurement data from the user terminal 100.

The identification unit 234 performs the same processes as those performed by the identification unit 135 included in the controller 130 of the user terminal 100, and therefore, explanation of the processes performed by the identification unit 234 will be omitted. Meanwhile, the identification unit 234 performs the same processes as those performed by the identification unit 135 included in the controller 130 of the user terminal 100 only when the acquisition unit 231 acquires the processing target data and the measurement data from the user terminal 100.

The determination unit 235 performs the same processes as those performed by the determination unit 133 included in the controller 130 of the user terminal 100, and therefore, explanation of the processes performed by the determination unit 235 will be omitted. Meanwhile, the determination unit 235 performs the same processes as those performed by the determination unit 133 included in the controller 130 of the user terminal 100 only when the acquisition unit 231 acquires the processing target data and the measurement data from the user terminal 100.

The compression unit 236 performs the same processes as those performed by the compression unit 134 included in the controller 130 of the user terminal 100, and therefore, explanation of the processes performed by the compression unit 236 will be omitted. Meanwhile, the compression unit 236 performs the same processes as those performed by the compression unit 134 included in the controller 130 of the user terminal 100 only when the acquisition unit 231 acquires the processing target data and the measurement data from the user terminal 100.

Meanwhile, FIG. 5 illustrates a case in which the user terminal 100 performs the processes from Step S1 to Step S8. However, it is sufficient that at least one of the user terminal 100 and the information processing apparatus 200 performs the processes from Step S4 to Step S7. To explain this point, FIG. 9 illustrates a flowchart of a process that is performed by the data processing system 1.

FIG. 9 is a flowchart illustrating a process performed by the data processing system as one example of the data processing according to one embodiment. For example, the data processing system 1 acquires processing target data that includes image data (Step S101). Further, the data processing system 1 measures biological information that includes line-of-sight information on a user (Step S102). Furthermore, the data processing system 1 calculates importance of the processing target data based on the line-of-sight information and the different biological information (Step S103). Moreover, the data processing system 1 determines a compression detail of the processing target data in accordance with the calculated importance (Step S104). Furthermore, the data processing system 1 compresses the processing target data in accordance with the determined compression detail (Step S105).

The user terminal 100 according to the present application includes the acquisition unit 140 that acquires processing target data that includes image data, the measurement unit 150 that measures biological information that includes line-of-sight information on a user, the calculation unit 131 that calculates importance of the processing target data based on the line-of-sight information that is included in the biological information and different biological information, the determination unit 133 that determines a compression detail of the processing target data in accordance with the importance, and the compression unit 134 that compresses the processing target data in accordance with the compression detail that is determined by the determination unit 133.

With this configuration, the user terminal 100 is able to determine the importance of the processing target data in accordance with a degree of concentration of the user, and change the compression detail of the processing target data. Therefore, it is possible to ensure data quality in accordance with needs of the user and reduce a data volume at the same time.

In the user terminal 100 according to the present application, the calculation unit 131 calculates the importance on a scale of one to three or more for each predetermined unit of the processing target data based on the line-of-sight information and the different biological information, and the user terminal 100 further includes the impartment unit 132 that imparts the importance calculated by the calculation unit 131 to each predetermined unit of the processing target data.

With this configuration, the user terminal 100 is able to calculate the importance for each predetermined unit of the processing target data, change the compression detail for each predetermined unit of the processing target data, and compress the processing target data. Therefore, it is possible to ensure data quality in accordance with needs of the user and reduce the data volume at the same time with high accuracy.

In the user terminal 100 according to the present application, the determination unit 133 determines the compression detail for each predetermined unit of the processing target data based on the importance that is imparted to each predetermined unit of the processing target data, and the compression unit 134 compresses the processing target data for each predetermined unit based on the compression detail that is determined by the determination unit 133 for each predetermined unit of the processing target data.

With this configuration, the user terminal 100 is able to calculate the importance for each predetermined unit of the processing target data, change the compression detail for each predetermined unit of the processing target data, and compress the processing target data. Therefore, it is possible to ensure data quality in accordance with needs of the user and reduce the data volume at the same time with high accuracy.

The user terminal 100 according to the present application further includes the identification unit 135 that analyzes the processing target data and identifies a situation of the user, and the calculation unit 131 calculates the importance of the processing target data while changing a weighting factor that is used for calculation of the importance of the processing target data in accordance with the situation that is identified by the identification unit 135.

With this configuration, the user terminal 100 is able to determine the importance of the processing target data after identifying the situation of the user. Therefore, it is possible to determine the importance based on not only the degree of concentration that is subjective information on the user, but also objective information, so that it is possible to ensure objectivity of the importance.

In the user terminal 100 according to the present application, the identification unit 135 analyzes the processing target data and identifies a change of the situation of the user, and the calculation unit 131 calculates the importance of the processing target data based on the line-of-sight information, the different biological information, and the change of the situation in the processing target data.

With this configuration, the user terminal 100 is able to calculate higher importance of the processing target data for a portion in which the situation of the user is changed, and reduce the compression ratio of the portion in the processing target data. Therefore, when the user checks the processing target data, it is possible to increase data quality of the portion, in which the situation is changed and which serves as a start portion, and determine the compression ratio for other portions in accordance with the importance based on the degree of concentration, so that it is possible to ensure the data quality and reduce the data volume at the same time.

The data processing method according to the present application includes a step of acquiring processing target data that includes image data, a step of measuring biological information that includes line-of-sight information on a user, a step of calculating importance of the processing target data based on the line-of-sight information that is included in the biological information and different biological information, a step of determining a compression detail of the processing target data in accordance with the importance, and a step of compressing the processing target data in accordance with the determined compression detail.

According to the data processing method that is configured as described above, it is possible to determine the importance of the processing target data in accordance with a degree of concentration of the user, and change the compression detail of the processing target data. Therefore, it is possible to ensure data quality in accordance with needs of the user and reduce a data volume at the same time.

The non-transitory storage medium that stores a data processing program according to the present application causes a computer to perform a process including a step of acquiring processing target data that includes image data, a step of measuring biological information that includes line-of-sight information on a user, a step of calculating importance of the processing target data based on the line-of-sight information that is included in the biological information and different biological information, a step of determining a compression detail of the processing target data in accordance with the importance, and a step of compressing the processing target data in accordance with the determined compression detail.

According to the non-transitory storage medium that stores a data processing program that is configured as described above, it is possible to determine the importance of the processing target data in accordance with a degree of concentration of the user, and change the compression detail of the processing target data. Therefore, it is possible to ensure data quality in accordance with needs of the user and reduce a data volume at the same time.

Although the invention has been described with respect to specific embodiments for a complete and clear application, the appended claims are not to be thus limited but are to be construed as embodying all modifications and alternative constructions that may occur to one skilled in the art that fairly fall within the basic teaching herein set forth.

A user terminal, a data processing method, and a non-transitory storage medium according to the present application can be applied, for example, to an information processing apparatus which can appropriately compress data in accordance with needs of a user.

According to the present application, it is possible to provide a user terminal, a data processing method, and a non-transitory storage medium that are able to appropriately compress data in accordance with needs of a user.

What is claimed is:

1. A user terminal comprising:
    an acquisition unit configured to acquire processing target data that includes image data;
    a measurement unit configured to measure, as biological information, line-of-sight information on a user and other biological information on the user other than the line-of-sight information;
    a calculation unit configured to calculates importance of the processing target data based on the line-of-sight information and the other biological information;
    a determination unit configured to determine a compression detail of the processing target data in accordance with the calculated importance; and
    a compression unit configured to compress the processing target data in accordance with the compression detail determined by the determination unit.

2. The user terminal according to claim 1, wherein
    the calculation unit is further configured to calculate the importance on a scale of one to three or more for each predetermined unit of the processing target data based on the line-of-sight information and the other biological information, and
    the user terminal further comprises an impartment unit configured to impart the importance calculated by the calculation unit to each predetermined unit of the processing target data.

3. The user terminal according to claim 2, wherein
    the determination unit is further configured to determine the compression detail for each predetermined unit of the processing target data based on the importance that is imparted to each predetermined unit of the processing target data, and
    the compression unit is further configured to compress the processing target data for each predetermined unit based on the compression detail determined by the determination unit for each predetermined unit of the processing target data.

4. The user terminal according to claim 1, further comprising:
    an identification unit configured to analyze the processing target data to identify a situation of the user, wherein
    the calculation unit is further configured to calculate the importance of the processing target data by changing a weighting factor that is used for calculation of the importance of the processing target data in accordance with the situation identified by the identification unit.

5. The user terminal according to claim 4, wherein
    the identification unit is further configured to analyze the processing target data to identify a change of the situation of the user, and
    the calculation unit is further configured to calculate the importance of the processing target data based on the line-of-sight information, the other biological information, and the change of the situation in the processing target data.

6. A data processing method comprising:
    acquiring processing target data that includes image data;
    measuring, as biological information, line-of-sight information on a user and other biological information on the user other than the line-of-sight information;
    calculating importance of the processing target data based on the line-of-sight information and the other biological information;
    determining a compression detail of the processing target data in accordance with the calculated importance; and
    compressing the processing target data in accordance with the determined compression detail.

7. A non-transitory storage medium that stores a data processing program causing a computer to execute a process comprising:
    acquiring processing target data that includes image data;
    measuring, as biological information, line-of-sight information on a user and other biological information on the user other than the line-of-sight information;
    calculating importance of the processing target data based on the line-of-sight information and the other biological information;
    determining a compression detail of the processing target data in accordance with the calculated importance; and
    compressing the processing target data in accordance with the determined compression detail.

* * * * *